Jan. 7, 1947.  F. LANTIERI  2,414,047
SPRAY HEAD FASTENING DEVICE
Filed Dec. 14, 1944
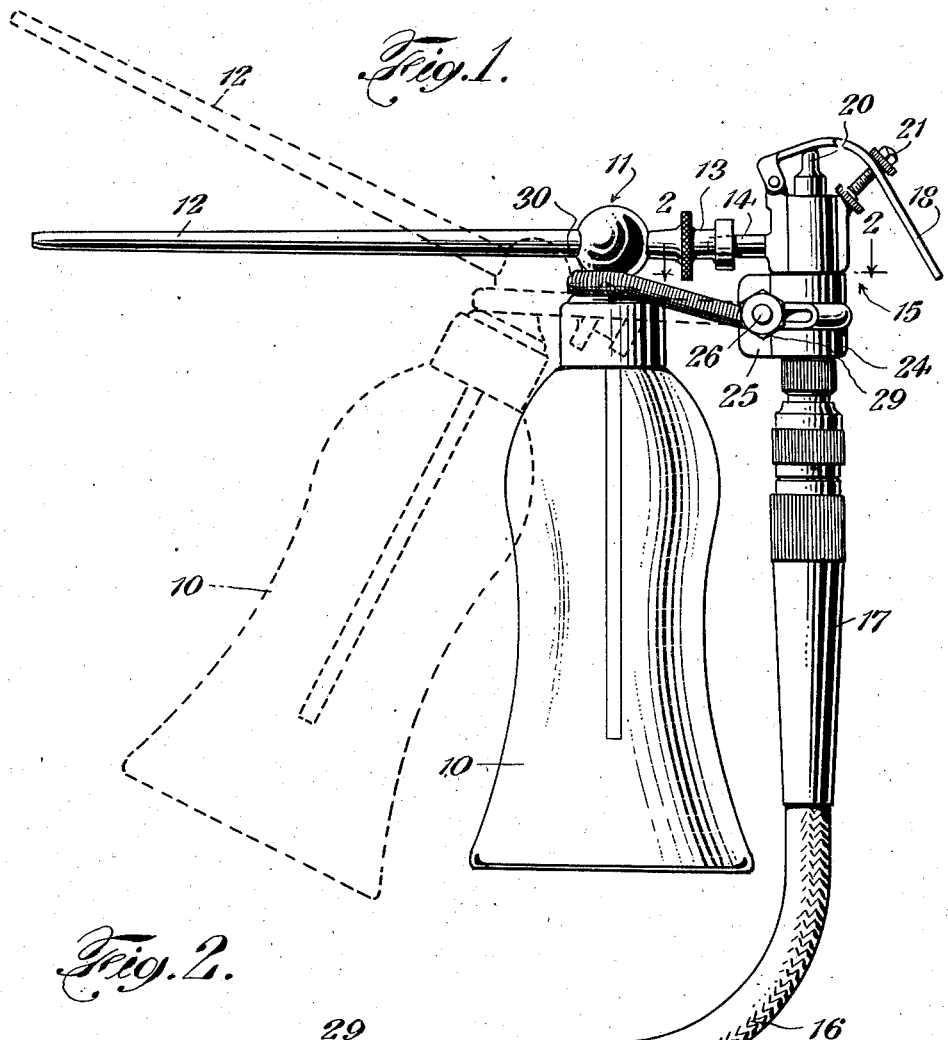
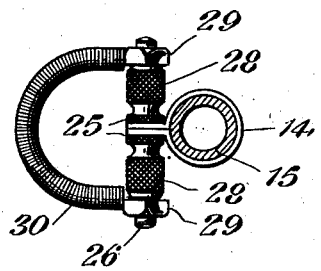
INVENTOR
Frank Lantieri
BY
Emery Varney Whittemore &c.
ATTORNEYS Patented Jan. 7, 1947

2,414,047

UNITED STATES PATENT OFFICE 2,414,047

SPRAY HEAD FASTENING DEVICE

Frank Lantieri, New York, N. Y.

Application December 14, 1944, Serial No. 568,143

4 Claims. (Cl. 285—108)

This invention relates to detachable fastening devices and more particularly to improved apparatus for fastening a compressed-gas line with the spray head of an atomizer bottle or other spraying containers or appliances.

In dentists' and doctors' offices, in studios, barber shops, beauty parlors and other places where liquids or fluids of different kinds or consistencies are sprayed by compressed gas, usually air, it is the practice for individual technicians or operators to use one air line at a time, and to connect the end of this air line successively with various size spray bottles or atomizers as they are needed for spraying.

The main line is usually tapped into to supply air to any number of branches and the number of operators employed determines the size of the installation in any single place.

Every branch has at the end of each air line an air regulating valve to enable the operator to have full control of the flow of air and also to turn the air on and off by a simple finger action.

The air line is commonly a flexible hose with a fitting at one end that can be detachably connected with the spray head of any individual bottle.

It is an object of this invention to provide an improved fastening device for connecting a spray head with an air-line fitting of the character indicated, especially with a fitting that comprises a valve head for controlling the flow of compressed air to the spray head by means of a quick-operating valve in position for a convenient actuation by a finger or the thumb of the hand in which the operator holds the valve head.

Another object of the invention is to provide a fastening device that can be used for securely attaching a hose fitting with a spray head more quickly and conveniently. In the preferred embodiment of the invention, this object is attained by providing connectors extending from opposite sides of the hose or valve fitting, and a coil spring that forms a loop extending out in front of the hose fitting with its opposite ends secured to the connectors. The spring is rigidly fastened to at least one of the connectors and is stiff enough so that it is self supporting in a plane substantially parallel to a spout on the hose fitting that fits into a conduit on the spray head.

An operator can easily insert the discharge nozzle and spray head of an atomizer through such an outstanding loop, especially with the ends of the spring spaced to give the loop a substantial width. The spring is of such length and strength that it is stretched when the spray head and atomizer are in assembled relation and this provides a force for holding the parts together.

Other objects, features and advantages of the invention will appear or be pointed out as the description proceeds.

In the drawing, forming a part hereof, in which like reference characters indicate corresponding parts in all the views, Figure 1 is a side elevation of an atomizer and a hose fitting connected together by a fastening device embodying this invention.

Figure 2 is a sectional view taken on the line 2—2 of Figure 1, but without the spray bottle.

Figure 1 shows spray equipment comprising an atomizer having a bottle 10 and a spray head 11 connected with the upper end of the bottle. The spray head 11 has a forwardly extending nozzle portion 12 and on its rearward side has an inlet connection including a conduit 13 into which fits a tapered spout 14.

The spout 14 is a part of a valve head 15 that comprises the end fitting on flexible air hose 16. At the lower end of the valve head 15 there is a handle portion 17. When an operator is using the spray equipment, he holds it in one hand by gripping the handle portion 17, and there is a lever 18 located in position for convenient actuation by the thumb of the operator's hand. The lever 18 is depressed to operate a plunger 20 which opens a valve in the valve head 15. A screw 21 extending up from the valve head provides stops for limting the stroke of the lever 18.

Below the upper end of the valve head there is a band 24 which extends around the valve head and has lugs 25 extending from the front of the valve head. These lugs have holes in them and a continuous thread screw 26 passes through these holes extending for some distance on either side of the hose fitting or valve head. Spacers comprising nuts 28 on the screw 26 are screwed up close and tight against the lugs 25. The nuts 28 clamp the band 24 forcing lugs 25 to come close together thereby firmly securing the band 24 to the hose fitting or valve head 15. The remaining screw ends allow the clamping of a coil spring 30 to be attached or removed quickly and easily for replacement when necessary. The band 24 with its lugs 25, screw 26 and nuts 28 comprise a bracket on the hose fitting or valve head 15. The screw 26 serves as a connection or connectors by which the bracket is connected with the coil spring 30.

This coil spring 30 has its opposite end loops attached to the ends of screw 26. These end loops are clamped and held in a rigid position against the end of the nuts 28 by other nuts 29. This spring is stiff enough to be self supporting, and its ends are clamped so as to maintain the spring in a position that forms a loop in a plane substantially parallel to the axis of the spout 14 and the conduit 13 into which the spout fits.

This position of the spring loop, particularly with the ends of the spring spaced some distance apart so that the loop has a substantial width, makes it very easy for an operator to insert the nozzle portion 12 and upper end of the spray head 11 into the spring loop so that the spring can be stretched forward, as indicated in dotted line in Figure 1, and the spray head positioned to allow the spout 14 to be inserted into the conduit 13.

The spring 30 is of such length that it is stretched when the spray head and valve head are in assembled relation, and the tension of the spring provides force for holding the parts together. The spring loop 30 permits the bottle 10 and spray head 11 to swivel with respect to the handle portion 17 of the hose fitting. Such swiveling action is about the axis of the spout 14 which is free to rotate in the conduit 13 and this makes it possible to use the valve head with bottles of various sizes, even though they are shaped so as not to leave sufficient room for the operator's fingers between the bottle 10 and handle portion 17 when the handle portion is directly in line with the widest portion of the bottle.

The preferred embodiment of the invention has been described, but changes and modifications can be made and some features of the invention can be used without others without departing from the invention as defined in the claims.

I claim as my invention:

1. An end fitting for connecting a compressed air line with an atomizer or other spray equipment, said fitting including a bottom portion for connection with an air-supply tube, a forwardly-extending spout at the upper portion of the fitting for connection with the spray equipment, and means for holding the spout in operative relation with an inlet opening of the spray equipment, said means comprising connectors on the fitting at spaced points on opposite sides of said spout and back of the forward end of said spout, and a coil spring forming a loop in front of the fitting and joined at opposite ends to said connectors with at least one end of the spring held by its connector in position to maintain the loop of the spring in a plane extending forward from the fitting.

2. A detachable fastening device for connecting an air-hose fitting to a spray head of an atomizer or spray equipment, said device comprising a band for extending around the fitting, lugs on opposite ends of the band, a screw extending through the lugs, spacers on the screw on opposite sides of the lugs for clamping the band to the fitting, nuts on the screw adjacent the spacers, and spring means connected by said nuts to the opposite ends of said screw for holding the fastening device on a spray head.

3. A fastening device for connecting a spray head of atomizing equipment with a valve head of a hose line, one of which heads has a spout that extends into a conduit in the other head, said spout having an axis in line with the axis of the end of the conduit into which the spout extends, and said fastening device comprising connectors extending from opposite sides of the valve head in directions transverse of the axis of the spout and conduit, and a spring element joined at opposite ends with the respective connectors and extending out in front of the valve head in the form of a loop, said spring element being of sufficient stiffness to support itself in a horizontal position and having at least one end connected rigidly with its associated connector to hold the loop of the spring element in a normal position with the plane of the loop substantially parallel with the axis of the spout and conduit.

4. Apparatus for detachably connecting a compressed-air line with an atomizer having a spray head including a forwardly-extending nozzle, a rearwardly-extending air inlet conduit and a groove located below the nozzle portion and inlet conduit, said apparatus comprising a fitting for connection with the end of a compressed air hose, a forwardly-extending spout on the fitting for insertion into an inlet conduit of the spray head, a band extending around the fitting, lugs at the ends of the band, a screw extending through the lugs, bushings on the screw on opposite sides of the lugs for holding the band securely to said fitting, nuts on the screw adjacent the bushings, and a coil spring with ends clamped against said bushings by the nuts, said coil spring forming a loop in a plane substantially parallel with the axis of the spout, and said spring being of such length and strength that it must be stretched to fit around the groove of the spray head when the spout is inserted in the inlet conduit of the spray head.

FRANK LANTIERI.